(12) United States Patent
Sutardja

(10) Patent No.: US 8,026,898 B2
(45) Date of Patent: Sep. 27, 2011

(54) LOW POWER OPTICAL MOUSE INCLUDING INDEPENDENT MOVEMENT DETECTION MODULE

(75) Inventor: Sehat Sutardja, Los Altos Hills, CA (US)

(73) Assignee: Marvell World Trade Ltd., St. Michael (BB)

( * ) Notice: Subject to any disclaimer, the term of this patent is extended or adjusted under 35 U.S.C. 154(b) by 831 days.

(21) Appl. No.: 11/788,119

(22) Filed: Apr. 19, 2007

(65) Prior Publication Data

US 2008/0100576 A1    May 1, 2008

Related U.S. Application Data

(63) Continuation of application No. 11/700,645, filed on Jan. 31, 2007, now abandoned.

(60) Provisional application No. 60/885,299, filed on Jan. 17, 2007, provisional application No. 60/863,863, filed on Nov. 1, 2006.

(51) Int. Cl.
*G06F 3/033* (2006.01)
*G09G 5/08* (2006.01)

(52) U.S. Cl. .................. 345/163; 345/164; 345/166

(58) Field of Classification Search .................. 345/163
See application file for complete search history.

(56) References Cited

U.S. PATENT DOCUMENTS

| 5,168,221 | A | * | 12/1992 | Houston | .................. 324/207.13 |
| 2002/0035701 | A1 | | 3/2002 | Casebolt | |
| 2002/0093481 | A1 | | 7/2002 | Kehlstadt | |
| 2003/0006965 | A1 | * | 1/2003 | Bohn | ............................. 345/163 |
| 2003/0160764 | A1 | | 8/2003 | Kuan | |
| 2005/0057511 | A1 | * | 3/2005 | Wang | ............................. 345/166 |

FOREIGN PATENT DOCUMENTS

GB    2 398 138    8/2003

OTHER PUBLICATIONS

Marshall Brain et al; "How Computer Mice Work"; http://computer.howstuffworks.com/mouse.htm/printable; Nov. 1, 2006; 14 pages.
Notification of Transmittal of the International Search Report and The Written Opinion of The International Searching Authority, or the Declaration dated Jun. 23, 2008 in reference to PCT/US2007/022582.

* cited by examiner

*Primary Examiner* — Richard Hjerpe
*Assistant Examiner* — Andrew Schnirel

(57) ABSTRACT

A wireless mouse comprises a movement detection module that detects movement of the wireless mouse. A detection module detects at least one of movement and usage of the wireless mouse during operation. The detection module consumes power at a slower rate than the movement detection module. A control module selectively powers down the movement detection module and wherein after the detection module detects the at least one of movement and usage, the control module powers up the movement detection module.

18 Claims, 9 Drawing Sheets

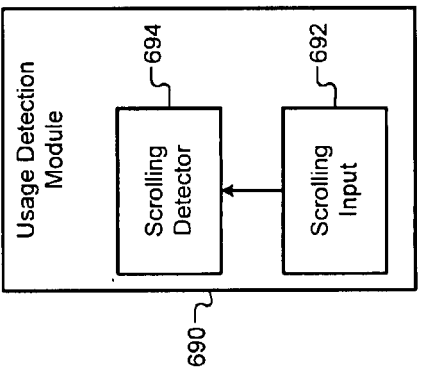
FIG. 6E
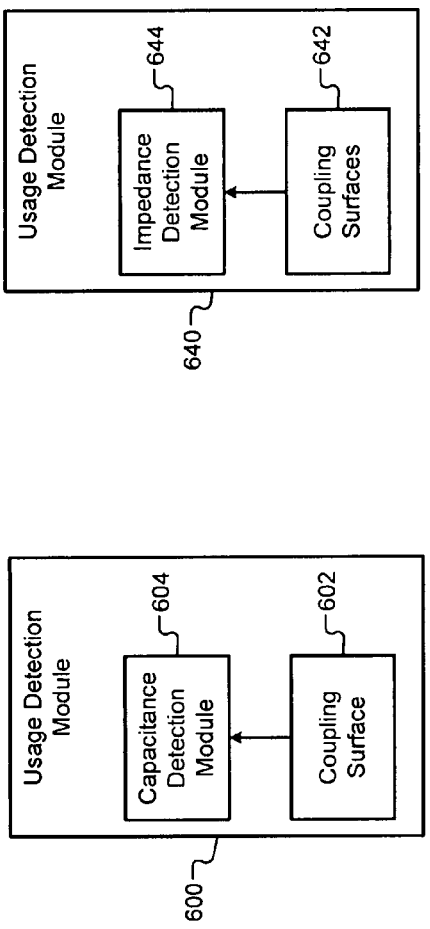
FIG. 6B
FIG. 6D
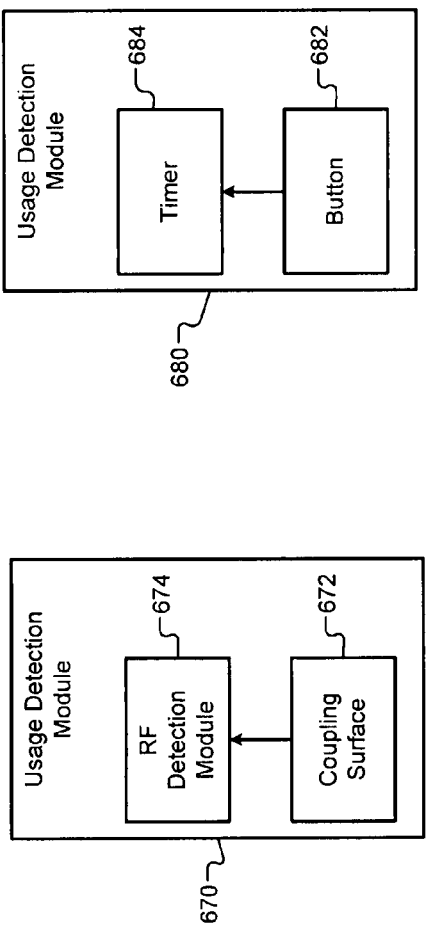
FIG. 6A
FIG. 6C ent detection module. After the movement detection module detects movement, the control module restarts detecting movement of the wireless optical mouse using the optical movement detection module.

LOW POWER OPTICAL MOUSE INCLUDING INDEPENDENT MOVEMENT DETECTION MODULE

CROSS-REFERENCE TO RELATED APPLICATIONS

This application is a continuation of U.S. Ser. No. 11/700,645, filed Jan. 31, 2007, which application claims the benefit of U.S. Provisional Application Nos. 60/885,299, filed Jan. 17, 2007, and 60/863,863, filed on Nov. 1, 2006. The disclosures of the above applications are incorporated herein by reference in their entirety.

FIELD

The present disclosure relates to optical mice, and more particularly to low power wireless optical mice.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Referring now to FIG. 1, a functional block diagram of an optical mouse 100 according to the prior art is shown. The optical mouse 100 includes a control module 102, a user interface 104, a radio frequency (RF) transceiver 106, an antenna 108, a light detecting module 110, a light generating module 112, and a battery 114.

The light generating module 112 emits light to a surface adjacent to the light generating module 112. The light generating module 112 may include a laser and/or a light emitting diode (LED). The light detecting module 110 receives reflected light from the surface. The light detecting module 110 processes the reflected light as image data, and analyzes the image data to detect movement of the optical mouse 100 relative to the surface. The control module 102 communicates with the user interface 104. The user interface 104 may include buttons, scroll wheels, tilt wheels, and/or other input devices.

The control module 102 outputs movement signals and user input data such as button clicks and/or scrolling from the user interface 104 to the RF transceiver 106. The RF transceiver 106 wirelessly communicates this data to a host (not shown) via the antenna 108. The battery 114 provides electrical power to the components of the optical mouse 100.

Since the optical mouse 100 is battery powered, it is important to reduce power consumption to prolong battery life. At least the light generating module 112 and light detecting module 110 need to be powered to detect movement of the mouse 100. Light generation and detection tends to consume relatively high power. However, the user may not use the wireless mouse for hours, days, or months on end. Some wireless optical mice may include on/off switches, which reduces power consumption and increases battery life when used. However, the user needs to remember to turn the wireless optical mouse off, which may not happen regularly.

SUMMARY

A wireless optical mouse comprises an optical movement detection module, a movement detection module, and a control module. The optical movement detection module emits light to detect movement of the wireless optical mouse. The movement detection module has a lower accuracy and consumes less power than the optical movement detection module when detecting movement of the wireless optical mouse. The control module selectively stops detecting movement of the wireless optical mouse using the optical movement detection module. After the movement detection module detects movement, the control module restarts detecting movement of the wireless optical mouse using the optical movement detection module.

In other features, a user interface detects user input. The control module restarts detecting movement of the wireless optical mouse using the optical movement detection module after the user interface detects user input. The control module stops detecting movement of the wireless optical mouse using the optical movement detection module after a predetermined period during which the user interface does not detect user input and the optical movement detection module does not detect movement. The optical movement detection module is powered down after the control module stops detecting movement of the wireless optical mouse using the optical movement detection module.

In further features, the optical movement detection module detects movement of the wireless optical mouse with lower accuracy when in a low-power active state and enters the low-power active state after a second predetermined period during which at least two of: the user interface does not detect user input, the optical movement detection module does not detect movement, and the movement detection module does not detect movement. The second predetermined period is shorter than the predetermined period.

In still other features, the movement detection module comprises a ball assembly including a ball; and a sensor module that detects movement of the wireless optical mouse based upon movement of the ball. The ball assembly includes a first roller that rotates about a first axis and is rotationally coupled to the ball. The ball assembly includes a second roller that rotates about a second axis and is rotationally coupled to the ball. The first and second axes are generally orthogonal. The ball assembly includes a disk including a magnet. The sensor module includes a Hall effect sensor. The ball assembly includes a disk including a magnet. The sensor module includes a current sensor.

A wireless optical mouse comprises an optical movement detection module that emits light to detect movement of the wireless optical mouse; a movement detection module that has a lower accuracy and consumes less power than the optical movement detection module when detecting movement of the wireless optical mouse; and a control module that selectively powers down the optical movement detection module and wherein after the movement detection module detects movement, the control module powers up the optical movement detection module.

In other features, a user interface that detects user input. The control module powers up the optical movement detection module after the user interface detects user input. The control module powers down the optical movement detection module after a predetermined period during which the user interface does not detect user input and the optical movement detection module does not detect movement. The user interface comprises at least one button.

In further features, the optical movement detection module detects movement of the wireless optical mouse with lower accuracy when in a low-power active state and enters the low-power active state after a second predetermined period during which at least two of: the user interface does not detect user input, the optical movement detection module does not detect movement, and the movement detection module does not detect movement. The second predetermined period is shorter than the predetermined period.

In still other features, the movement detection module comprises a ball assembly including a ball; and a sensor module that detects movement of the wireless optical mouse based upon movement of the ball. The ball assembly includes a first roller that rotates about a first axis and is rotationally coupled to the ball. The ball assembly includes a second roller that rotates about a second axis and is rotationally coupled to the ball. The first and second axes are generally orthogonal. The ball assembly includes a disk including a magnet. The sensor module includes a Hall effect sensor. The ball assembly includes a disk including a magnet. The sensor module includes a current sensor.

A method comprises using an optical movement detection module that emits light to detect movement of the wireless optical mouse; using a movement detection module that has a lower accuracy and consumes less power than the optical movement detection module when detecting movement of the wireless optical mouse; selectively stopping detecting movement of the wireless optical mouse using the optical movement detection module; and restarting detecting movement of the wireless optical mouse using the optical movement detection module after the movement detection module detects movement.

In other features, the method further comprises detecting user input. The method further comprises restarting detecting movement of the wireless optical mouse using the optical movement detection module after user input is detected. The method further comprises stopping detecting movement of the wireless optical mouse using the optical movement detection module after a predetermined period during which user input is not detected and the optical movement detection module does not detect movement. The method further comprises powering down the optical movement detection module after stopping detecting movement of the wireless optical mouse using the optical movement detection module.

In further features, the optical movement detection module detects movement of the wireless optical mouse with lower accuracy when in a low-power active state and enters the low-power active state after a second predetermined period during which at least two of: user input is not detected, the optical movement detection module does not detect movement, and the movement detection module does not detect movement. The second predetermined period is shorter than the predetermined period. The movement detection module comprises a ball assembly including a ball; and a sensor module that detects movement of the wireless optical mouse based upon movement of the ball.

In still other features, the ball assembly includes a first roller that rotates about a first axis and is rotationally coupled to the ball. The ball assembly includes a second roller that rotates about a second axis and is rotationally coupled to the ball. The first and second axes are generally orthogonal. The ball assembly includes a disk including a magnet. The sensor module includes a Hall effect sensor. The ball assembly includes a disk including a magnet. The sensor module includes a current sensor.

A wireless optical mouse comprises using an optical movement detection module that emits light to detect movement of the wireless optical mouse; using a movement detection module that has a lower accuracy and consumes less power than the optical movement detection module when detecting movement of the wireless optical mouse; selectively powering down the optical movement detection module; and powering up the optical movement detection module after the movement detection module detects movement.

In other features, the method further comprises detecting user input and powering up the optical movement detection module after user input is detected. The method further comprises powering down the optical movement detection module after a predetermined period during which user input is not detected and the optical movement detection module does not detect movement.

In further features, the optical movement detection module detects movement of the wireless optical mouse with lower accuracy when in a low-power active state and enters the low-power active state after a second predetermined period during which at least two of: user input is not detected, the optical movement detection module does not detect movement, and the movement detection module does not detect movement. The second predetermined period is shorter than the predetermined period.

In still other features, the movement detection module comprises a ball assembly including a ball; and a sensor module that detects movement of the wireless optical mouse based upon movement of the ball. The ball assembly includes a first roller that rotates about a first axis and is rotationally coupled to the ball. The ball assembly includes a second roller that rotates about a second axis and is rotationally coupled to the ball. The first and second axes are generally orthogonal. The ball assembly includes a disk including a magnet. The sensor module includes a Hall effect sensor. The ball assembly includes a disk including a magnet. The sensor module includes a current sensor.

A wireless optical mouse comprises optical movement detecting means for emitting light to detect movement of the wireless optical mouse; movement detecting means for detecting movement of the wireless optical mouse that has a lower accuracy and consumes less power than the optical movement detecting means; and control means for selectively stopping detecting movement of the wireless optical mouse using the optical movement detecting means and wherein after the movement detecting means detects movement, for restarting detecting movement of the wireless optical mouse using the optical movement detecting means.

In other features, the wireless optical mouse includes user interfacing means for detecting user input. The control means restarts detecting movement of the wireless optical mouse using the optical movement detecting means after the user interfacing means detects user input. The control means stops detecting movement of the wireless optical mouse using the optical movement detecting means after a predetermined period during which the user interfacing means does not detect user input and the optical movement detecting means does not detect movement. The optical movement detecting means is powered down after the control means stops detecting movement of the wireless optical mouse using the optical movement detecting means.

In further features, the optical movement detecting means detects movement of the wireless optical mouse with lower accuracy when in a low-power active state and enters the low-power active state after a second predetermined period during which at least two of: the user interfacing means does not detect user input, the optical movement detecting means does not detect movement, and the movement detecting means does not detect movement. The second predetermined period is shorter than the predetermined period.

In still other features, the movement detecting means comprises a ball assembly including a ball; and sensing means for detecting movement of the wireless optical mouse based upon movement of the ball. The ball assembly includes first rolling means for rotating about a first axis and for being rotationally coupled to the ball. The ball assembly includes second rolling means for rotating about a second axis and for being rotationally coupled to the ball. The first and second axes are generally orthogonal. The ball assembly includes a disk including a magnet. The sensing means includes a Hall effect sensor. The ball assembly includes a disk including a magnet. The sensing means includes a current sensor.

An wireless optical mouse comprises optical movement detecting means for emitting light to detect movement of the wireless optical mouse; movement detecting means for detecting movement of the wireless optical mouse and that has a lower accuracy and consumes less power than the optical movement detecting means; and control means for selectively powering down the optical movement detecting means and wherein after the movement detecting means detects movement, for powering up the optical movement detecting means.

In other features, the wireless optical mouse includes user interfacing means for detecting user input. The control means powers up the optical movement detecting means after the user interfacing means detects user input. The control means powers down the optical movement detecting means after a predetermined period during which the user interfacing means does not detect user input and the optical movement detecting means does not detect movement. The user interfacing means comprises at least one button.

In further features, the optical movement detecting means detects movement of the wireless optical mouse with lower accuracy when in a low-power active state and enters the low-power active state after a second predetermined period during which at least two of: the user interfacing means does not detect user input, the optical movement detecting means does not detect movement, and the movement detecting means does not detect movement. The second predetermined period is shorter than the predetermined period.

In still other features, the movement detecting means comprises a ball assembly including a ball; and sensing means for detecting movement of the wireless optical mouse based upon movement of the ball. The ball assembly includes first rolling means for rotating about a first axis and for being rotationally coupled to the ball. The ball assembly includes second rolling means for rotating about a second axis and for being rotationally coupled to the ball. The first and second axes are generally orthogonal. The ball assembly includes a disk including a magnet. The sensing means includes a Hall effect sensor. The ball assembly includes a disk including a magnet. The sensing means includes a current sensor.

A wireless optical mouse comprises an optical movement detection module that emits light to detect movement of the wireless optical mouse; a touch detection module that detects user contact with the wireless optical mouse; and a control module that selectively stops detecting movement of the wireless optical mouse using the optical movement detection module and wherein after the touch detection module detects user contact, the control module restarts detecting movement of the wireless optical mouse using the optical movement detection module.

In other features, a user interface detects user input. The control module restarts detecting movement of the wireless optical mouse using the optical movement detection module after the user interface detects user input. The control module stops detecting movement using the optical movement detection module after a predetermined period during which at least two of the user interface does not detect user input the touch detection module does not detect user contact, and the optical movement detection module does not detect movement. The optical movement detection module is powered down after the control module stops detecting movement of the wireless optical mouse using the optical movement detection module.

In further features, the optical movement detection module detects movement of the wireless optical mouse with lower accuracy when in a low-power active state and enters the low-power active state after a second predetermined period during which at least two of: the user interface does not detect user input, the optical movement detection module does not detect movement, and the touch detection module does not detect user contact. The second predetermined period is shorter than the predetermined period. The touch detection module comprises a coupling surface; and a sensor module that detects user contact with the coupling surface.

In still other features, the wireless optical mouse further comprises a palm resting surface. The coupling surface includes at least part of the palm resting surface. The coupling surface includes first and second coupling surfaces. The sensor module detects user contact based upon impedance changes between the first and second coupling surfaces. The sensor module detects user contact based upon radio frequency (RF) signals coupled to the coupling surface. The sensor module detects user contact based upon changes in capacitance of the coupling surface.

A wireless optical mouse comprises an optical movement detection module that emits light to detect movement of the wireless optical mouse; a touch detection module that detects user contact with the wireless optical mouse; and a control module that selectively powers down the optical movement detection module and wherein after the touch detection module detects user contact, the control module powers up the optical movement detection module.

In other features, a user interface detects user input. The control module powers up the optical movement detection module after the user interface detects user input. The control module powers down the optical movement detection module after a predetermined period during which at least two of the user interface does not detect user input the touch detection module does not detect user contact, and the optical movement detection module does not detect movement. The user interface comprises at least one button.

In further features, the optical movement detection module detects movement of the wireless optical mouse with lower accuracy when in a low-power active state and enters the low-power active state after a second predetermined period during which at least two of: the user interface does not detect user input, the optical movement detection module does not detect movement, and the touch detection module does not detect user contact. The second predetermined period is shorter than the predetermined period. The touch detection module comprises a coupling surface; and a sensor module that detects user contact with the coupling surface.

In still other features, the wireless optical mouse further comprises a palm resting surface. The coupling surface includes at least part of the palm resting surface. The coupling surface includes first and second coupling surfaces. The sensor module detects user contact based upon impedance changes between the first and second coupling surfaces. The sensor module detects user contact based upon radio frequency (RF) signals coupled to the coupling surface. The sensor module detects user contact based upon changes in capacitance of the coupling surface.

A method comprises using an optical movement detection module that emits light to detect movement of a wireless optical mouse; detecting user contact with the wireless optical mouse; selectively stopping detecting movement of the wireless optical mouse using the optical movement detection module; and restarting detecting movement of the wireless optical mouse using the optical movement detection module after the movement detection module detects movement.

In other features, the method further comprises detecting user input and restarting detecting movement of the wireless optical mouse using the optical movement detection module after user input is detected. The method further comprises stopping detecting movement of the wireless optical mouse using the optical movement detection module after a predetermined period during which at least two of user input is not detected user contact is not detected, and the optical movement detection module does not detect movement.

In further features, the method further comprises powering down the optical movement detection module after stopping detecting movement of the wireless optical mouse using the optical movement detection module. The optical movement detection module detects movement of the wireless optical mouse with lower accuracy when in a low-power active state and enters the low-power active state after a second predetermined period during which at least two of: user input is not detected, the optical movement detection module does not detect movement, and user contact is not detected. The second predetermined period is shorter than the predetermined period.

In still other features, the method further comprises detecting user contact with a coupling surface of the wireless optical mouse. The coupling surface includes at least part of a palm resting surface of the wireless optical mouse. The coupling surface includes first and second coupling surfaces and further comprises detecting user contact based upon impedance changes between the first and second coupling surfaces. The method further comprises detecting user contact based upon radio frequency (RF) signals coupled to the coupling surface. The sensor module detects user contact based upon changes in capacitance of the coupling surface.

A method comprises using an optical movement detection module that emits light to detect movement of a wireless optical mouse; detecting user contact with the wireless optical mouse; and selectively powering down the optical movement detection module; and powering up the optical movement detection module after the movement detection module detects movement.

In other features, the method further comprises detecting user input and powering up the optical movement detection module after user input is detected. The method further comprises powering down the optical movement detection module after a predetermined period during which at least two of user input is not detected user contact is not detected, and the optical movement detection module does not detect movement. The optical movement detection module detects movement of the wireless optical mouse with lower accuracy when in a low-power active state and enters the low-power active state after a second predetermined period during which at least two of: user input is not detected, the optical movement detection module does not detect movement, and user contact is not detected. The second predetermined period is shorter than the predetermined period.

In further features, the method further comprises detecting user contact with a coupling surface of the wireless optical mouse. The coupling surface includes at least part of a palm resting surface of the wireless optical mouse. The coupling surface includes first and second coupling surfaces and further comprises detecting user contact based upon impedance changes between the first and second coupling surfaces. The method further comprises detecting user contact based upon radio frequency (RF) signals coupled to the coupling surface. The sensor module detects user contact based upon changes in capacitance of the coupling surface.

A wireless optical mouse comprises optical movement detecting means for emitting light to detect movement of the wireless optical mouse; touch detecting means for detecting user contact with the wireless optical mouse; and control means for selectively stopping detecting movement of the wireless optical mouse using the optical movement detecting means and wherein after the touch detecting means detects user contact, for restarting detecting movement of the wireless optical mouse using the optical movement detecting means.

In other features, the wireless optical mouse further comprises user interfacing means for detecting user input. The control means restarts detecting movement of the wireless optical mouse using the optical movement detecting means after the user interfacing means detects user input. The control means stops detecting movement using the optical movement detecting means after a predetermined period during which at least two of the user interfacing means does not detect user input the touch detecting means does not detect user contact, and the optical movement detecting means does not detect movement. The optical movement detecting means is powered down after the control means stops detecting movement of the wireless optical mouse using the optical movement detecting means.

In further features, the optical movement detecting means detects movement of the wireless optical mouse with lower accuracy when in a low-power active state and enters the low-power active state after a second predetermined period during which at least two of: the user interfacing means does not detect user input, the optical movement detecting means does not detect movement, and the touch detecting means does not detect user contact. The second predetermined period is shorter than the predetermined period. The touch detecting means comprises coupling surface means for providing a conductive contact surface; and sensing means for detecting user contact with the coupling surface means.

In still other features, the wireless optical mouse further comprises a palm resting surface. The coupling surface means includes at least part of the palm resting surface. The coupling surface means includes first and second coupling surface means for providing distinct contact surfaces. The sensing means detects user contact based upon impedance changes between the first and second coupling surface means. The sensing means detects user contact based upon radio frequency (RF) signals coupled to the coupling surface means. The sensing means detects user contact based upon changes in capacitance of the coupling surface means.

A wireless optical mouse comprises optical movement detecting means for emitting light to detect movement of the wireless optical mouse; touch detecting means for detecting user contact with the wireless optical mouse; and control means for selectively powering down the optical movement detecting means and wherein after the touch detecting means detects user contact, for powering up the optical movement detecting means.

In other features, the wireless optical mouse further comprises user interfacing means for detecting user input. The control means powers up the optical movement detecting means after the user interfacing means detects user input. The control means powers down the optical movement detecting means after a predetermined period during which at least two of the user interfacing means does not detect user input the touch detecting means does not detect user contact, and the optical movement detecting means does not detect movement. The user interfacing means comprises at least one button.

In further features, the optical movement detecting means detects movement of the wireless optical mouse with lower accuracy when in a low-power active state and enters the low-power active state after a second predetermined period during which at least two of: the user interfacing means does not detect user input, the optical movement detecting means does not detect movement, and the touch detecting means does not detect user contact. The second predetermined period is shorter than the predetermined period. The touch detecting means comprises coupling surface means for providing a conductive contact surface; and sensing means for detecting user contact with the coupling surface means.

In still other features, the wireless optical mouse further comprises a palm resting surface. The coupling surface means includes at least part of the palm resting surface. The coupling surface means includes first and second coupling surface means for providing distinct contact surfaces. The sensing means detects user contact based upon impedance changes between the first and second coupling surface means. The sensing means detects user contact based upon radio frequency (RF) signals coupled to the coupling surface means. The sensing means detects user contact based upon changes in capacitance of the coupling surface means.

A wireless mouse comprises a movement detection module that detects movement of the wireless mouse; a detection module that detects at least one of movement and usage of the wireless mouse during operation. The detection module consumes power at a slower rate than the movement detection module; and a control module that selectively powers down the movement detection module and wherein after the detection module detects the at least one of movement and usage, the control module powers up the movement detection module.

In other features, the detection module includes a touch detection module that detects user contact with the wireless mouse. The control module powers up the movement detection module after the touch detection module detects user contact. The wireless mouse further comprises a user interface that detects user input. The control module powers up the movement detection module after the user interface detects user input. The user interface comprises at least one button.

In further features, the control module powers up the movement detection module after the at least one button is pressed for a predetermined period of time. The control module powers down the movement detection module after a predetermined period during which at least two of: the user interface does not detect user input, the touch detection module does not detect user contact, and the movement detection module does not detect movement. The movement detection module includes an optical movement detection module that emits light to detect movement of the wireless mouse.

In still other features, the optical movement detection module detects movement of the wireless mouse with lower accuracy when in a low-power active state and enters the low-power active state after a second predetermined period during which at least two of: the user interface does not detect user input, the optical movement detection module does not detect movement, and the touch detection module does not detect user contact. The second predetermined period is shorter than the predetermined period. The touch detection module comprises a coupling surface; and a sensor module that detects user contact with the coupling surface.

In other features, the wireless mouse further comprises a palm resting surface. The coupling surface includes at least part of the palm resting surface. The coupling surface includes first and second coupling surfaces. The sensor module detects user contact based upon impedance changes between the first and second coupling surfaces. The sensor module detects user contact based upon radio frequency (RF) signals coupled to the coupling surface. The sensor module detects user contact based upon changes in capacitance of the coupling surface.

In further features, the detection module includes a second movement detection module that detects movement of the wireless mouse. The control module powers up the movement detection module after the second movement detection module detects movement of the wireless mouse. The wireless mouse further comprises a user interface that detects user input. The control module powers up the movement detection module after the user interface detects user input.

In still other features, the user interface comprises at least one button. The control module powers up the movement detection module after the at least one button is pressed for a predetermined period of time. The control module powers down the movement detection module after a predetermined period during which at least two of: the user interface does not detect user input, the movement detection module does not detect movement, and the second movement detection module does not detect movement.

In other features, the movement detection module includes an optical movement detection module that emits light to detect movement of the wireless mouse. The optical movement detection module detects movement of the wireless mouse with lower accuracy when in a low-power active state and enters the low-power active state after a second predetermined period during which at least two of: the user interface does not detect user input, the optical movement detection module does not detect movement, and the second movement detection module does not detect movement. The second predetermined period is shorter than the predetermined period.

In further features, the second movement detection module comprises a ball assembly including a ball; and a sensor module that detects movement of the wireless mouse based upon movement of the ball. The ball assembly includes a first roller that rotates about a first axis and is rotationally coupled to the ball. The ball assembly includes a second roller that rotates about a second axis and is rotationally coupled to the ball. The first and second axes are generally orthogonal. The ball assembly includes a disk including a magnet. The sensor module includes a Hall effect sensor. The ball assembly includes a disk including a magnet. The sensor module includes a current sensor.

A method comprises using a movement detection module to detect movement of a wireless mouse; using a detection module to detect at least one of movement and usage of the wireless mouse during operation. The detection module consumes power at a slower rate than the movement detection module; selectively powering down the movement detection module; and powering up the movement detection module after the detection module detects the at least one of movement and usage. The method further comprises detecting user contact with the wireless mouse. The movement detection module is powered up after user contact is detected.

In other features, the method further comprises detecting user input. The method further comprises powering up the movement detection module after user input is detected. Detecting user input includes providing at least one button. The method further comprises powering up the movement detection module after the at least one button is pressed for a predetermined period of time. The method further comprises powering down the movement detection module after a predetermined period during which at least two of: user input is not detected, user contact is not detected, and the movement detection module does not detect movement.

In further features, the movement detection module emits light to detect movement of the wireless mouse. The movement detection module detects movement of the wireless mouse with lower accuracy when in a low-power active state and enters the low-power active state after a second predetermined period during which at least two of: user input is not detected, the movement detection module does not detect movement, and user contact is not detected. The second predetermined period is shorter than the predetermined period.

In still other features, detecting user contact includes providing a coupling surface and further comprises detecting user contact with the coupling surface. The method further comprises providing a palm resting surface. The coupling surface includes at least part of the palm resting surface. The coupling surface includes first and second coupling surfaces and further comprises detecting user contact based upon impedance changes between the first and second coupling surfaces. The method further comprises detecting user contact based upon radio frequency (RF) signals coupled to the coupling surface.

In other features, the method further comprises detecting user contact based upon changes in capacitance of the coupling surface. The detection module includes a second movement detection module that detects movement of the wireless mouse and further comprises powering up the movement detection module after the second movement detection module detects movement of the wireless mouse. The method further comprises detecting user input. The method further comprises powering up the movement detection module after user input is detected. Detecting user input includes providing at least one button.

In further features, the method further comprises powering up the movement detection module after the at least one button is pressed for a predetermined period of time. The method further comprises powering down the movement detection module after a predetermined period during which at least two of: user input is not detected, the movement detection module does not detect movement, and the second movement detection module does not detect movement. The movement detection module emits light to detect movement of the wireless mouse.

In still other features, the movement detection module detects movement of the wireless mouse with lower accuracy when in a low-power active state and enters the low-power active state after a second predetermined period during which at least two of: user input is not detected, the movement detection module does not detect movement, and the second movement detection module does not detect movement. The second predetermined period is shorter than the predetermined period. The second movement detection module comprises a ball assembly including a ball and further comprises detecting movement of the wireless mouse based upon movement of the ball.

In other features, the ball assembly includes a first roller that rotates about a first axis and is rotationally coupled to the ball. The ball assembly includes a second roller that rotates about a second axis and is rotationally coupled to the ball. The first and second axes are generally orthogonal. The ball assembly includes a disk including a magnet and further comprises detecting movement of the ball using a Hall effect sensor. The ball assembly includes a disk including a magnet and further comprises detecting movement of the ball using a current sensor.

A wireless mouse comprises movement detecting means for detecting movement of the wireless mouse; detecting means for detecting at least one of movement and usage of the wireless mouse during operation. The detecting means consumes power at a slower rate than the movement detecting means; and control means for selectively powering down the movement detecting means and wherein after the detecting means detects the at least one of movement and usage, for powering up the movement detecting means.

In other features, the detecting means includes touch detecting means for detecting user contact with the wireless mouse. The control means powers up the movement detecting means after the touch detecting means detects user contact. The wireless mouse further comprises user interfacing means for detecting user input. The control means powers up the movement detecting means after the user interfacing means detects user input. The user interfacing means comprises at least one button. The control means powers up the movement detecting means after the at least one button is pressed for a predetermined period of time.

In further features, the control means powers down the movement detecting means after a predetermined period during which at least two of: the user interfacing means does not detect user input, the touch detecting means does not detect user contact, and the movement detecting means does not detect movement. The movement detecting means includes optical movement detecting means for emitting light to detect movement of the wireless mouse. The optical movement detecting means detects movement of the wireless mouse with lower accuracy when in a low-power active state and enters the low-power active state after a second predetermined period during which at least two of: the user interfacing means does not detect user input, the optical movement detecting means does not detect movement, and the touch detecting means does not detect user contact. The second predetermined period is shorter than the predetermined period.

In still other features, the touch detecting means comprises coupling surface means for providing a conductive contact surface; and sensing means for detecting user contact with the coupling surface means. The wireless mouse further comprises a palm resting surface. The coupling surface means includes at least part of the palm resting surface. The coupling surface means includes first and second coupling surface means for providing distinct contact surfaces. The sensing means detects user contact based upon impedance changes between the first and second coupling surface means.

In other features, the sensing means detects user contact based upon radio frequency (RF) signals coupled to the coupling surface means. The sensing means detects user contact based upon changes in capacitance of the coupling surface means. The detecting means includes second movement detecting means for detecting movement of the wireless mouse. The control means powers up the movement detecting means after the second movement detecting means detects movement of the wireless mouse. The wireless mouse further comprises user interfacing means for detecting user input.

In further features, the control means powers up the movement detecting means after the user interfacing means detects user input. The user interfacing means comprises at least one button. The control means powers up the movement detecting means after the at least one button is pressed for a predetermined period of time. The control means powers down the movement detecting means after a predetermined period during which at least two of: the user interfacing means does not detect user input, the movement detecting means does not detect movement, and the second movement detecting means does not detect movement.

In still other features, the movement detecting means includes optical movement detecting means for emitting light to detect movement of the wireless mouse. The optical movement detecting means detects movement of the wireless mouse with lower accuracy when in a low-power active state and enters the low-power active state after a second predetermined period during which at least two of: the user interfacing means does not detect user input, the optical movement detecting means does not detect movement, and the second movement detecting means does not detect movement. The second predetermined period is shorter than the predetermined period.

In other features, the second movement detecting means comprises a ball assembly including a ball; and sensing means for detecting movement of the wireless mouse based upon movement of the ball. The ball assembly includes first rolling means for rotating about a first axis and for being rotationally coupled to the ball. The ball assembly includes second rolling means for rotating about a second axis and for being rotationally coupled to the ball. The first and second axes are generally orthogonal. The ball assembly includes a disk including a magnet. The sensing means includes a Hall effect sensor. The ball assembly includes a disk including a magnet. The sensing means includes a current sensor.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 6A-6E are functional block diagrams of exemplary usage detection modules according to the present disclosure;

DETAILED DESCRIPTION

Figure 1:
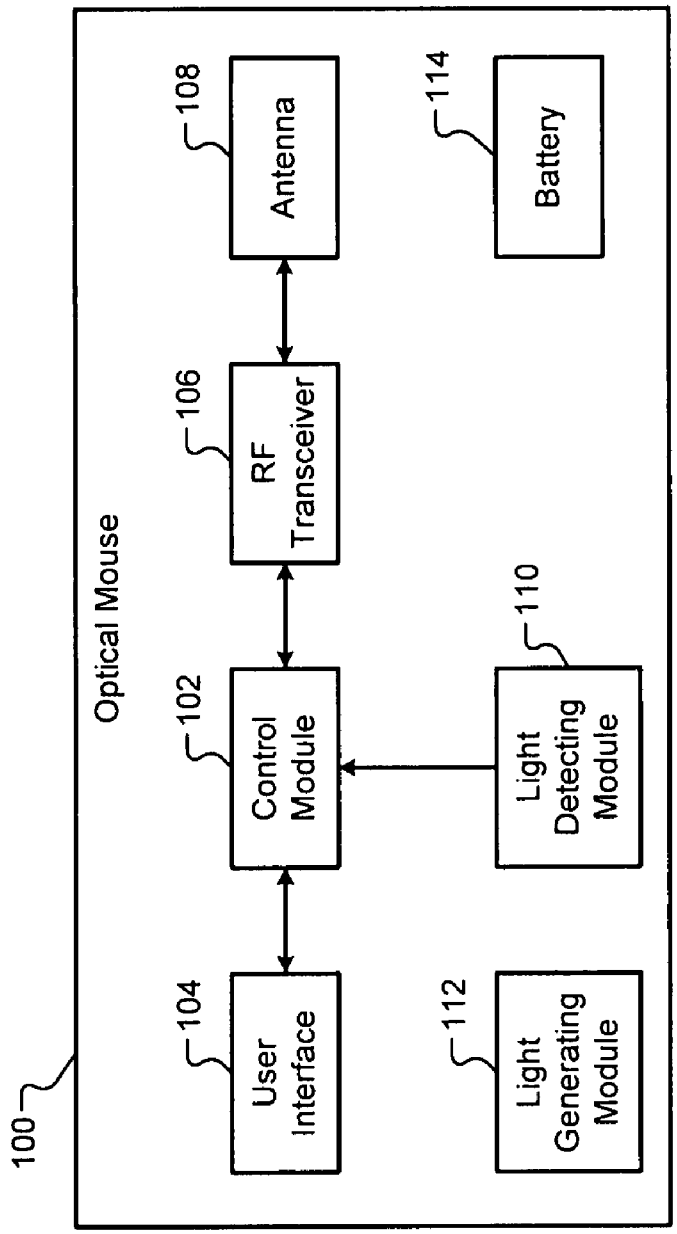
FIG. 1 is a functional block diagram of an optical mouse according to the prior art.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. It should be understood that steps within a method may be executed in different order without altering the principles of the present disclosure.

According to the present disclosure, an optical mouse includes an optical movement sensing system. When the optical movement sensing system of a conventional optical mouse does not detect movement for a predetermined period, the optical mouse transitions the optical movement sensing system to a lower power mode. However, the lower power mode still requires that a light emitting diode to be powered, which dissipates relatively high power and reduces battery life. The optical mouse remains in the lower power mode until movement is detected and then returns to the high power mode for more accurate movement detection. Therefore, the optical mouse is always in either the high power or lower power mode, both of which dissipate relatively high power.

According to the present disclosure, the optical mouse also includes another sensing system in addition to the optical movement sensing system to detect usage or movement. The other sensing systems described herein generally consume less power than the optical movement sensing system operating in the lower power mode. When no movement is detected by the optical movement sensing system for a predetermined period, the optical movement sensing system is powered down and the other movement sensing system is used to detect usage or movement of the mouse. When the other movement sensing system detects usage or movement, the optical movement sensing system is powered up and senses movement of the optical mouse.

Optionally, the optical mouse may initially transition from a higher power optical movement detecting mode to a lower power optical movement detecting mode after a first period. If no movement is detected for a second period after the first period, then the optical mouse may be switched to the other sensing system.

Figure 2:
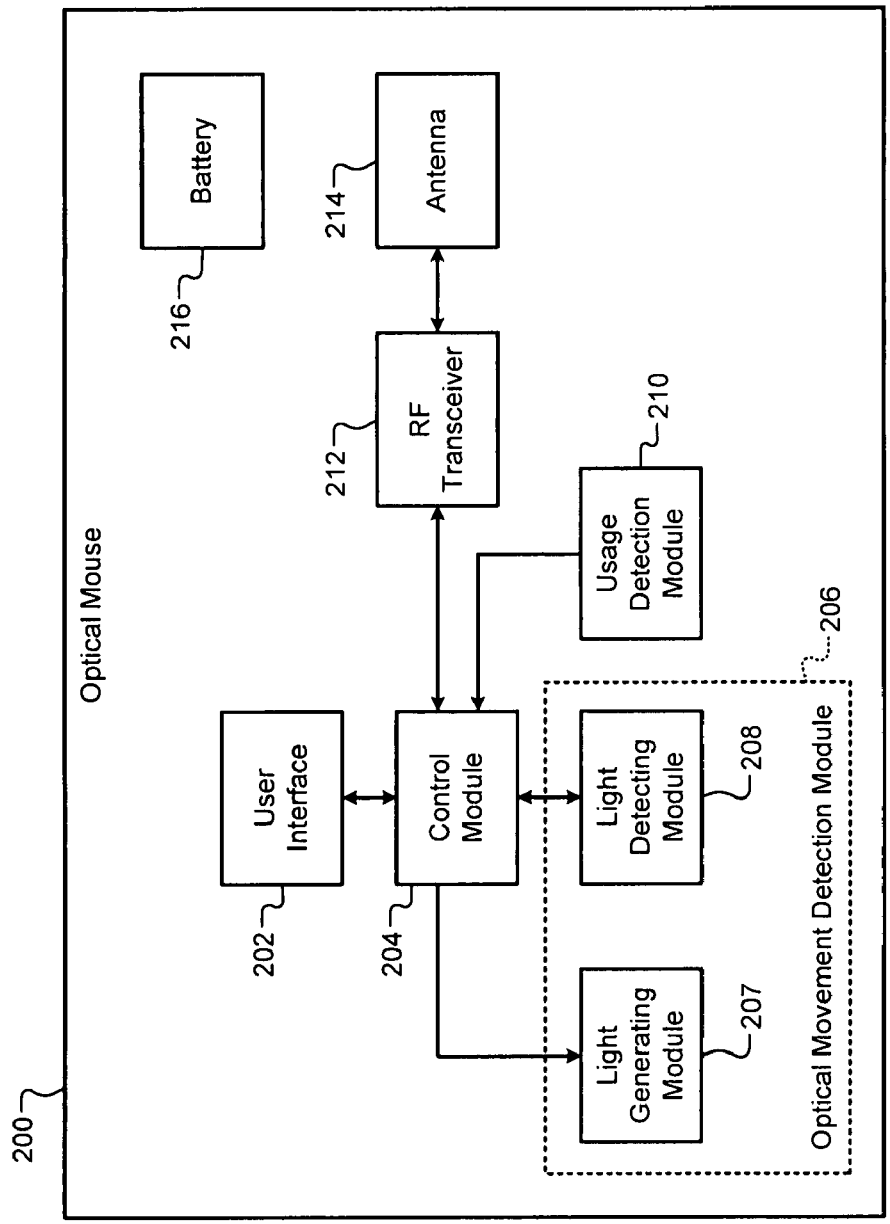
FIG. 2 is a functional block diagram of an exemplary optical mouse according to the present disclosure.

Referring now to FIG. 2, a functional block diagram of an exemplary wireless optical mouse 200 is shown. The optical mouse 200 includes a user interface 202, a control module 204, an optical movement detection module 206, a usage detection module 210, a radio frequency (RF) transceiver 212, an antenna 214, and a battery 216.

The user interface 202 may include buttons, scroll wheels, tilt wheels, light-emitting diodes (LEDs), and/or other input devices. The control module 204 receives input signals from the user interface 202 indicating button presses, wheel actuations, etc. The optical movement detection module 206 includes a light generating module 207 and a light detecting module 208. The light generating module 207 selectively emits light onto a surface adjacent to the optical mouse 200. Light reflected by the adjacent surface (if present) and is received by the light detecting module 208.

The light detecting module 208 analyzes image data based on the reflected light. The light detecting module 208 and/or the control module 204 compares newly acquired image data with stored image data to determine relative movement of the optical mouse 200 and the mousing surface. The control module 204 selectively communicates movement data and other data based on the input signals to the RF transceiver 212.

The RF transceiver 212 communicates with a host (not shown) via the antenna 214. The control module 204 may negotiate a secure connection with the host via the RF transceiver 212. The battery 216 provides electrical power to the components of the optical mouse 200. To save power, the control module 204 may select an inactive mode that does not employ optical sensing of movement when the optical mouse 200 is not in use. When the optical mouse 200 is once again in use, the control module 204 selects an active mode that employs optical movement detection.

In the inactive mode, the optical movement detection module 206 draws little or no power. In various embodiments, during the inactive mode, the light generating module 207 is completely powered down and the light detecting module 208 may draw only enough current to maintain state information but not to perform processing. Alternately, the light detecting module 208 may be fully powered down.

Optionally, the active mode may include a full-power active mode and a low-power active mode. Before selecting the inactive mode, the control module 204 may select the low-power active mode. In the low-power active mode, the optical movement detection module 206 draws less power but does not detect movement as precisely as when in the full-power active mode. The light generating module 207 may also produce less light. The optical movement detection module 206 may return to full-power active mode more quickly from the low-power active mode than from the inactive mode. In various embodiments, during the low-power active mode, the light generating module 207 generates light of lower intensity and the light detecting module 208 performs processing less frequently or at a slower speed than during the full-power active mode.

The control module 204 may define non-use as when no movement or other user input signals (such as button clicks, scrolling, etc.) have been detected for a predetermined period of time. The control module 204 then waits for user interaction before selecting the active mode. In various embodiments, the control module 204 powers down the user interface 202 during inactive mode. If the user interface 202 is not powered down, button presses and/or wheel activations can indicate user interaction.

The usage detection module 210 is designed to sense user interaction with the optical mouse 200 while using less power than the optical movement detection module 206. In various embodiments, the control module 204 powers down the usage detection module 210 during the active mode. Two exemplary ways that the usage detection module 210 can detect user interaction are described in detail below. Still other ways of detecting usage are contemplated.

The first exemplary type of usage detection involves movement detection, which may tend to use less power than the optical movement detection module 206 because precision is not required any movement of the mouse is sufficient. When movement is detected, the control module can select the active mode, where the optical movement detection module 206 provides for precise movement tracking. The second exemplary type of usage detection involves sensing physical contact, such as with the user's hand. When the user grips the optical mouse 200, the control module 204 can select the active mode to track movement of the optical mouse 200.

Figure 3C:
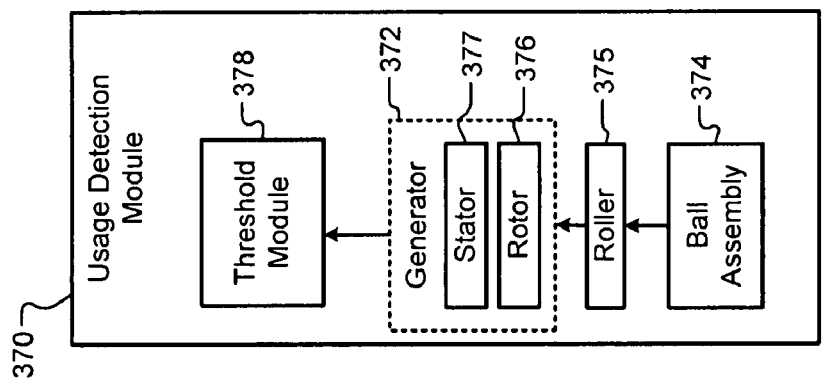
FIGS. 3A-3C are functional block diagrams of exemplary usage detection modules according to the present disclosure.
Figure 3B:
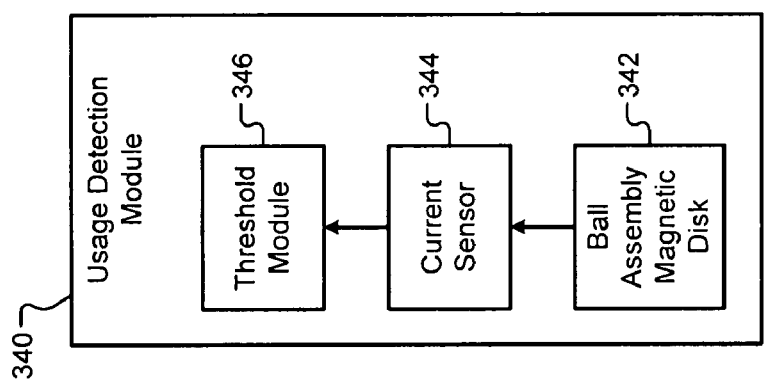
Figure 3A:
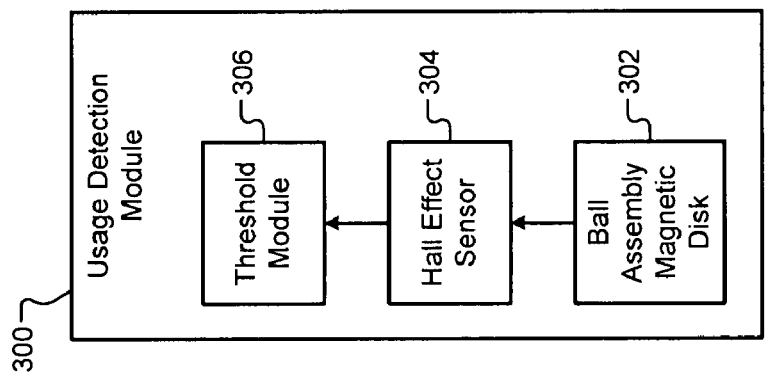

Referring now to FIG. 3A, a functional block diagram of an exemplary usage detection module 300 is shown. The usage detection module 300 may include a ball assembly 302, a Hall effect sensor 304, and a threshold module 306. The ball assembly 302 may include a spherical mouse ball that contacts an adjacent surface and rotates when one of the optical mouse or the adjacent surface is moved relative to the other.

One or more rollers contact the mouse ball. Each roller is connected to a disk, which includes at least one magnet. As the mouse ball rotates, the magnet passes by the Hall effect sensor 304. The Hall effect sensor 304 can detect changes in the magnetic field as the magnet passes by, and communicates this information to the threshold module 306.

The threshold module 306 determines whether the signal received from the Hall effect sensor 304 is sufficient to indicate motion of the optical mouse. Values used by threshold module 306 can be set so that bumping of the surface and vibration of the optical mouse during travel are not sufficient to indicate usage.

Referring now to FIG. 3B, another exemplary usage detection module 340 is shown. The usage detection module 340 may include a ball assembly 342, a current sensor 344, and a threshold module 346. The ball assembly 342 may include a spherical mouse ball that contacts the mousing surface, one or more rollers that contact the mouse ball, and disks attached to the rollers.

Each disk may have at least one magnet attached thereto. As the magnet passes the current sensor 344, the moving magnet induces current in an adjacent conductor of the current sensor 344. The current is communicated to the threshold module 346. In various embodiments, the current is amplified and/or converted to a voltage before being communicated.

Referring now to FIG. 3C, a functional block diagram of another exemplary usage detection module 370 is shown. The usage detection module 370 may include a generator 372, a ball assembly 374, and a threshold module 378. The generator 372 may include a rotor 376 and a stator 377. The roller 375 rotates with a spherical mouse ball of the ball assembly 374. The roller 375 may be coupled for rotation to the rotor 376 of the generator 372. As the rotor 376 rotates relative to the stator, current is generated in the stator 377. The current output by the generator 372 is monitored by the threshold module 378. When the current exceeds a threshold, the usage detection module 370 detects movement.

Figure 4:
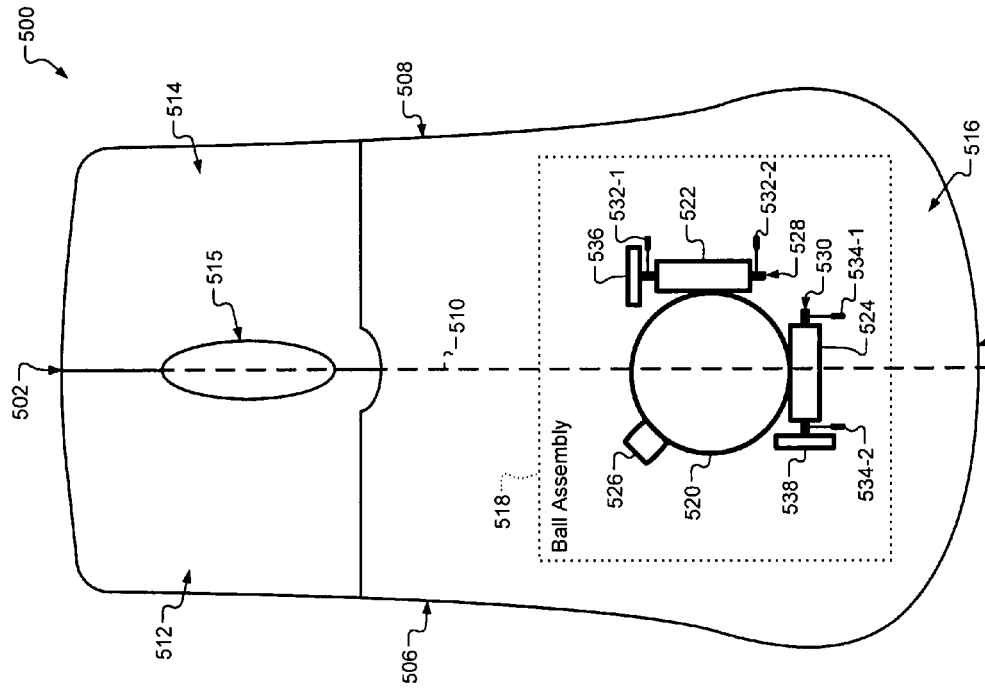

Referring now to FIG. 4, a plan view of an exemplary optical mouse 500 is shown. The optical mouse may include two rollers that are arranged to detect translational movement of the optical mouse. For example, the rollers may be arranged orthogonal or approximately orthogonal to one another. For example only, the optical mouse 500 includes a front end 502, a back end 504, a left side 506, and a right side 508. A longitudinal line 510 runs from the center of the front end 502 to the center of the back end 504. A left button 512 and a right button 514 are defined between the left side 506 and the right side 508 and adjacent to the front end 502.

A scrolling wheel 515 may be situated between the buttons 512 and 514 and in various embodiments along the longitudinal line 510. The scrolling wheel 515 may be sensitive to pressing and/or to tilting. A palm resting surface 516 spans from the back end 504 up to the buttons 512 and 514. A ball assembly 518 is located within the portion of the optical mouse 500 covered by the palm resting surface 516.

The ball assembly 518 includes a spherical mouse ball 520, first and second rollers 522 and 524, and an optional idler roller 526. The idler roller 526 ensures that the mouse ball 520 makes contact with the first and second rollers 522 and 524. The first and second rollers 522 and 524 rotate about axles 528 and 530, respectively.

The axles 528 and 530 are each supported by two supports, 532-1 and 532-2, and 534-1 and 534-2, respectively. The rollers 522 and 524 communicate with disks 536 and 538, respectively. The disks 536 and 538 may have transparent slits and/or may contain magnets, as described in more detail above. When the optical mouse 500 or the mousing surface is moved relative the other, the mouse ball 520 rotates within the ball assembly 518.

This movement is translated to the rollers 522 and 524, which are connected to the disks 536 and 538. Movement of the optical mouse 500 can then be recognized based upon rotation of the disks 536 and 538. The first roller 522 rotates about an axis parallel to the longitudinal line 510, and therefore corresponds to x-axis movement of the optical mouse 500.

The second roller 524 rotates about an axis perpendicular to the longitudinal line 510, and therefore corresponds to y-axis movement of the optical mouse 500. The ball assembly 518 is used to detect presence or absence of movement, and does not need to precisely report movement. The buttons 512 and 514 may contact electrical switches, which are actuated by pressing the respective button.

Figure 5:
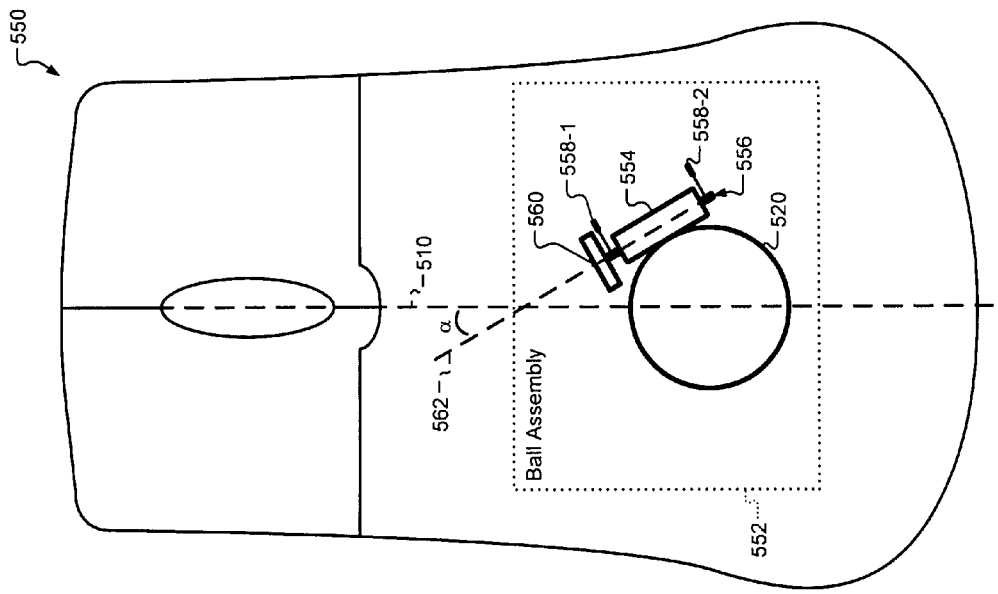
FIGS. 4 and 5 are plan views of exemplary optical mice according to the present disclosure.

Referring now to FIG. 5, the optical mouse may include a single roller to sense translational movement of the optical mouse. For example only, the roller may be arranged along vertical or horizontal planes in a plan view or at an angle with respect to horizontal and vertical planes in a plan view. For purposes of clarity, reference numerals from FIG. 4 are used to identify similar components. The optical mouse 550 includes a ball assembly 552. The ball assembly 552 includes a roller 554 that contacts the mouse ball 520. The roller 554 rotates on an axle 556, which is supported by supports 558-1 and 558-2.

A disk 560 is connected to, and rotates with, the roller 554. The roller 554 rotates about an angular line 562 that is disposed at an angle α from the longitudinal line 510. Because the ball assembly 552 is used only to detect movement, and not to precisely determine movement of the optical mouse 550, a single roller, such as the roller 554, is less expensive and requires less power to monitor than two rollers.

The angle α is determined so that normal mouse usage will cause the roller 554 to turn. The angle α may be less than 45 degrees so that the roller 554 is more sensitive to side to side movement. Many users employ side to side movement when returning to a computer and/or bringing a computer out of power saving mode.

In various implementations, the angle α is approximately equal to 30 degrees. In various other implementations, the angle α is approximately equal to 45 degrees or 60 degrees. The angle α may lie within a range between 30 and 60 degrees. Still other angles may be used. The ball assembly 552 may also be situated such that the roller 554 is in contact with one of the other three quadrants of the spherical mouse ball 520. In various embodiments, an idler roller (not shown) keeps the mouse ball 520 in contact with the roller 554

Referring now to FIG. 6A, a functional block diagram of an exemplary usage detection module 600 is shown. The usage detection module 600 may include at least one coupling surface 602 and a capacitance detection module 604. The coupling surface 602 is located on the exterior of the optical mouse, and may include the entire exterior of the optical mouse.

When a user touches or comes in close contact with the coupling surface 602, the capacitance detection module 604 senses the capacitance of the user's body. Exemplary ways of sensing this capacitance are described in detail with respect to FIGS. 7A-7B. The capacitance detection module 604 then outputs a signal indicating that the optical mouse is in use.

Referring now to FIG. 6B, a functional block diagram of another exemplary usage detection module 640 is shown. The usage detection module 640 includes multiple coupling surfaces 642 and an impedance detection module 644. The coupling surfaces 642 are arrayed on the exterior of the optical mouse.

In various embodiments, at least two of the coupling surfaces 642 are not in electrical contact with each other. When a user touches two or more of the coupling surfaces 642, the impedance detection module 644 can sense an impedance change between the coupling surfaces 642. The impedance detection module 644 then outputs a signal indicating that the optical mouse is in use.

Referring now to FIG. 6C, a functional block diagram of another exemplary implementation of a usage detection module 670 is shown. The usage detection module 670 may include at least one coupling surface 672 and a radio frequency (RF) detection module 674. When a user contacts the coupling surface 672, radio frequency (RF) waves are coupled to the coupling surface 672 through the user's body acting as an antenna. These electromagnetic signals are detected by the RF detection module 674, and a signal is output indicating that the optical mouse is in use.

Referring now to FIG. 6D, a functional block diagram of another usage detection module is shown. The usage detection module 680 includes a mouse button 682 and a timer 684. When a user depresses the mouse button for a predetermined period, the usage detection module 680 transitions the optical mouse back to the optical-based motion detection mode. As such, power to the button 682 may be maintained during the low power mode.

Referring now to FIG. 6E, a functional block diagram of another usage detection module is shown. The usage detection module 690 includes a scrolling input device 692 and a scrolling detector 694. When a user scrolls the scrolling input greater than a predetermined distance, the usage detection module 690 transitions the optical mouse back to the optical-based motion detection mode. As such, power to the scrolling input 692 may be maintained during the low power mode. The scrolling input device 692 may include a scrolling wheel, a track ball-type input and/or other rotating input device.

Figure 7B:
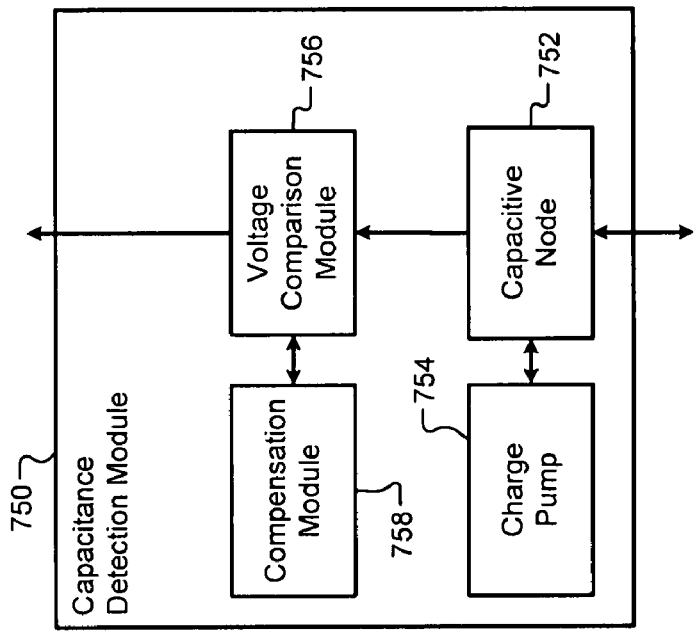
FIGS. 7A-7B are functional block diagrams of exemplary capacitance detection modules according to the present disclosure.
Figure 7A:
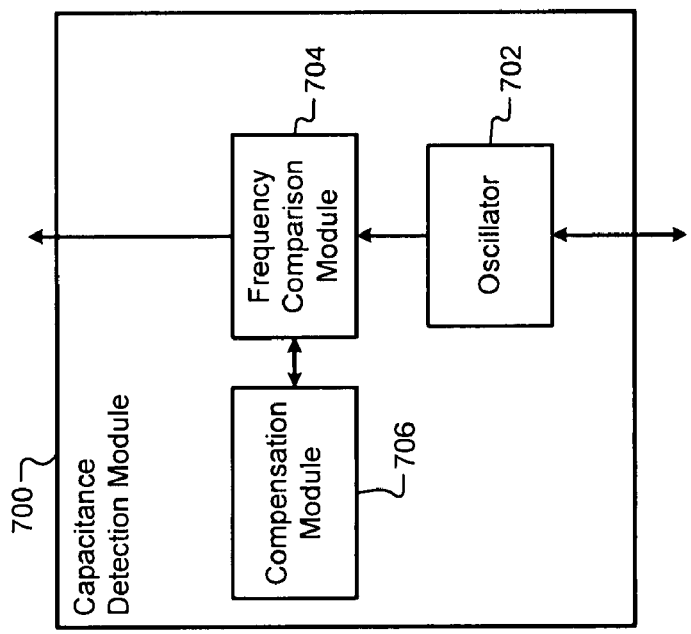

Referring now to FIG. 7A, a functional block diagram of an exemplary capacitance detection module is shown. The capacitance detection module 700 may include an oscillator 702, a frequency comparison module 704, and a compensation module 706. The oscillator 702 includes reactive components that cause the oscillator 702 to oscillate at a predetermined frequency. The reactive elements of the oscillator 702 communicate with a coupling surface. When a user touches or draws near to the coupling surface, the capacitance seen by the oscillator 702 changes. The frequency of oscillation therefore also changes. This change is monitored by the frequency comparison module 704.

When a frequency change greater than a predetermined value has occurred, the frequency comparison module 704 signals that the optical mouse is in use. The compensation module 706 gradually adapts the frequency comparison module 704 to a frequency being produced by the oscillator 702. This allows for shifts in operating characteristics of the oscillator 702 or in capacitance of the coupling surface.

Referring now to FIG. 7B, a functional block diagram of another exemplary capacitance detection module 750 is shown. The capacitance detection module 750 may include a capacitive node 752, a charge pump 754, a voltage comparison module 756, and a compensation module 758. The charge pump 754 places charge on and removes charge from the capacitive note 752 at a predetermined rate.

At the end of each cycle of charge placement and each cycle of charge removal, the capacitive node 752 will reach a terminal voltage before the voltage begins changing in the other direction. When the capacitance of a user's body is coupled to the capacitive node 752 by a coupling surface, the added capacitance slows the rate of change at the capacitive node 752.

This may prevent the capacitive node 752 from reaching one of the terminal voltages before the voltage begins changing in the other direction. The voltage comparison module 756 senses that the voltage reached is short of the terminal voltage and outputs a signal indicating that user capacitance has been detected. The compensation module 758 gradually adapts the voltage comparison module 756 to long-term changes in the terminal voltages of the capacitive node 752.

Figure 7D:
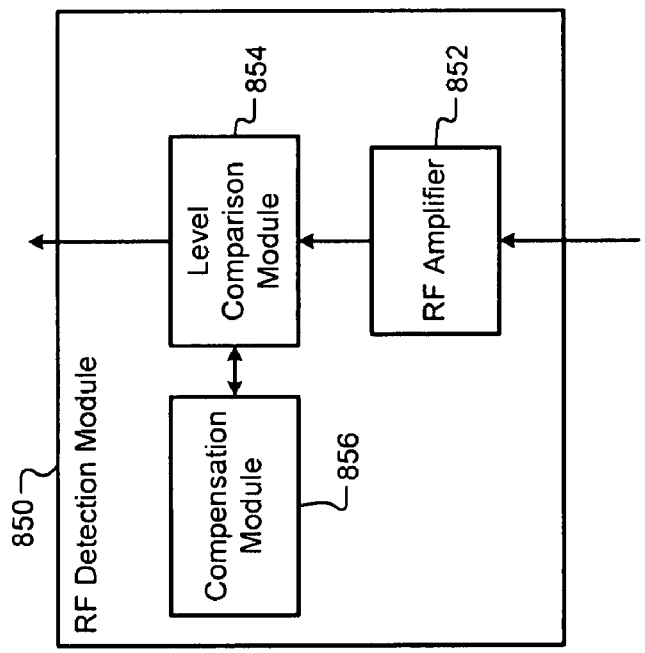
FIG. 7D is a functional block diagram of an exemplary RF detection module according to the present disclosure.
Figure 7C:
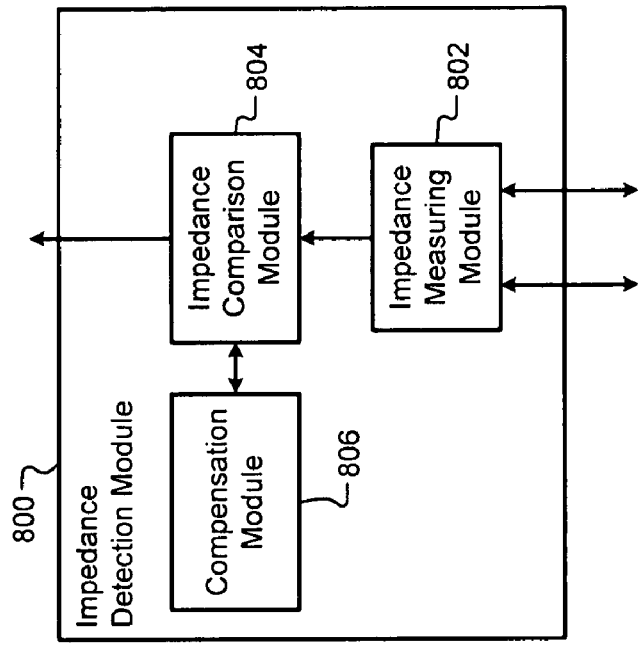
FIG. 7C is a functional block diagram of an exemplary impedance detection module according to the present disclosure.

Referring now to FIG. 7C, a functional block diagram of an exemplary impedance detection module 800 is shown. The impedance detection module 800 includes an impedance measuring module 802, an impedance comparison module 804, and a compensation module 806. The impedance measuring module 802 measures the impedance between two coupling surfaces. When a user is not contacting the coupling surfaces, the impedance measured may be an open circuit. In various embodiments, impedance may be measured between points of a single coupling surface when the coupling surface is not highly conductive.

The measured impedance is communicated to the impedance comparison module 804. When the measured impedance changes, the impedance comparison module 804 outputs a signal indicating that user interaction has been detected. The compensation module 806 gradually adapts the impedance comparison module 804 to changes in measured impedance.

Referring now to FIG. 7D, a functional block diagram of an exemplary RF detection module 850 is shown. The RF detection module 850 includes an RF amplifier 852, a level comparison module 854, and a compensation module 856. The RF amplifier 852 amplifies received signals, such as those from a user's body acting as an antenna. An output of the RF amplifier 852 is communicated to the level comparison module 854.

The level comparison module 854 may include a peak detector, a frequency filter, and/or a level detector. When the level comparison module 854 determines that the output of the RF amplifier 852 has increased due to a user's contact, the level comparison module 854 outputs a user contact signal. The compensation module 856 gradually adapts the level comparison module 854 to changes in output from the RF amplifier 852.

Figure 8B:
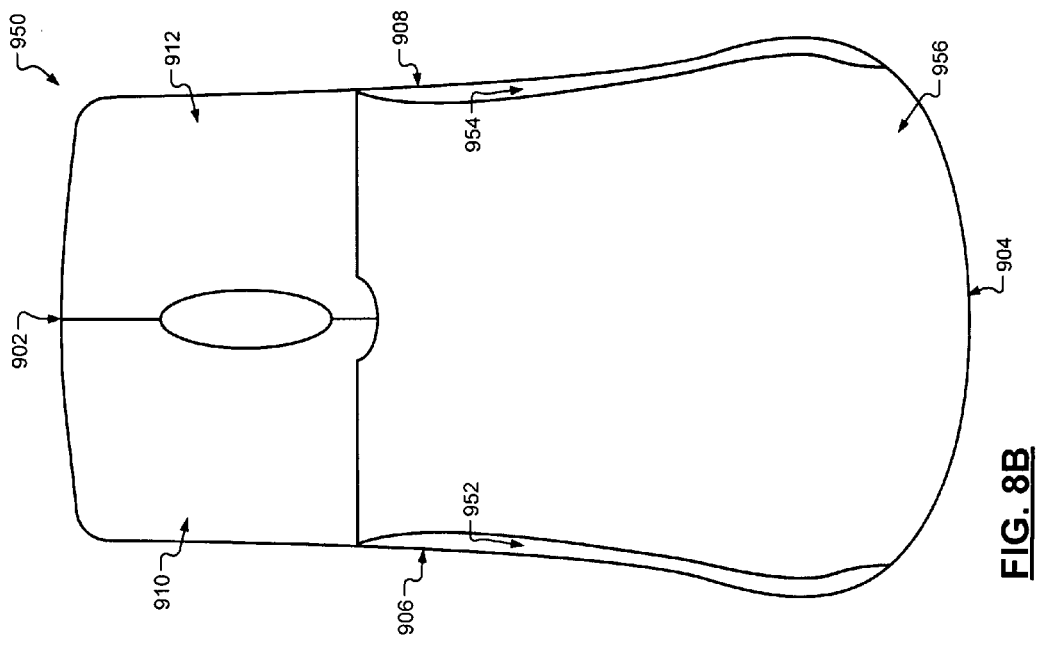
FIGS. 8A-8B are plan views of exemplary optical mice according to the present disclosure.
Figure 8A:
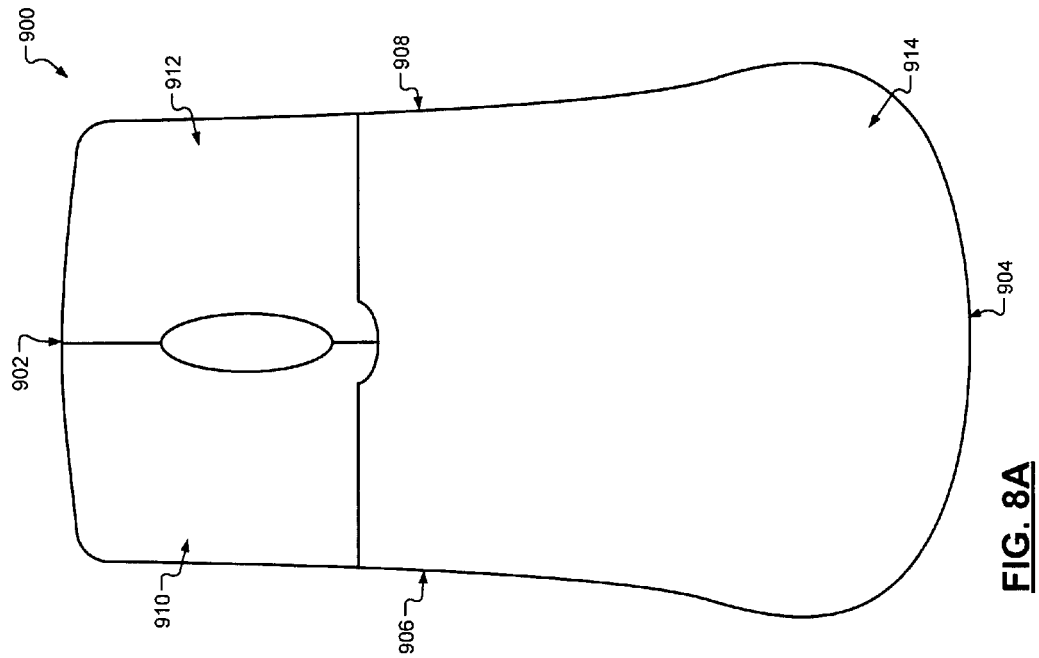

Referring now to FIG. 8A, a plan view of an exemplary optical mouse 900 is shown. The optical mouse 900 includes a front end 902, a back end 904, a left side 906, and a right side 908. The optical mouse 900 includes left and right buttons 910 and 912, which are adjacent to each other and to the front end 902.

The left and right buttons 910 and 912 are also adjacent to the left and right sides 906 and 908, respectively. A palm resting surface 914 is defined from the back end 904 to the buttons 910 and 912. In various implementations, the palm resting surface 914 serves as a coupling surface, such as the coupling surfaces of FIGS. 6A-6C. Additionally, the left and/or right buttons 910 and 912 may serve as coupling surfaces.

Referring now to FIG. 8B, a plan view of another exemplary optical mouse 950 is shown. For purposes of clarity, reference numerals from FIG. 8A are used to identify similar components. The optical mouse 950 includes a left gripping surface 952, which is disposed along the left side 906.

The optical mouse 950 also includes a right gripping surface 954, which is disposed along the right side 908. The left and right gripping surfaces 952 and 954 may extend from sides of the buttons 910 and 912 opposite the front end 902 to the back end 904. A palm resting surface 956 is disposed between the left and right gripping surfaces 952 and 954.

A user will typically grip the optical mouse 950 with their thumb on one of the gripping surfaces 952 and 954, one or more of their other fingers on the other of the gripping surfaces 952 and 954, and their palm on the palm resting surface 956. In various implementations, the left and right gripping surfaces 952 and 954 serve as coupling surfaces. The palm resting surface 956 and left and right buttons 910 and 912 may also function as coupling surfaces.

Figure 9:
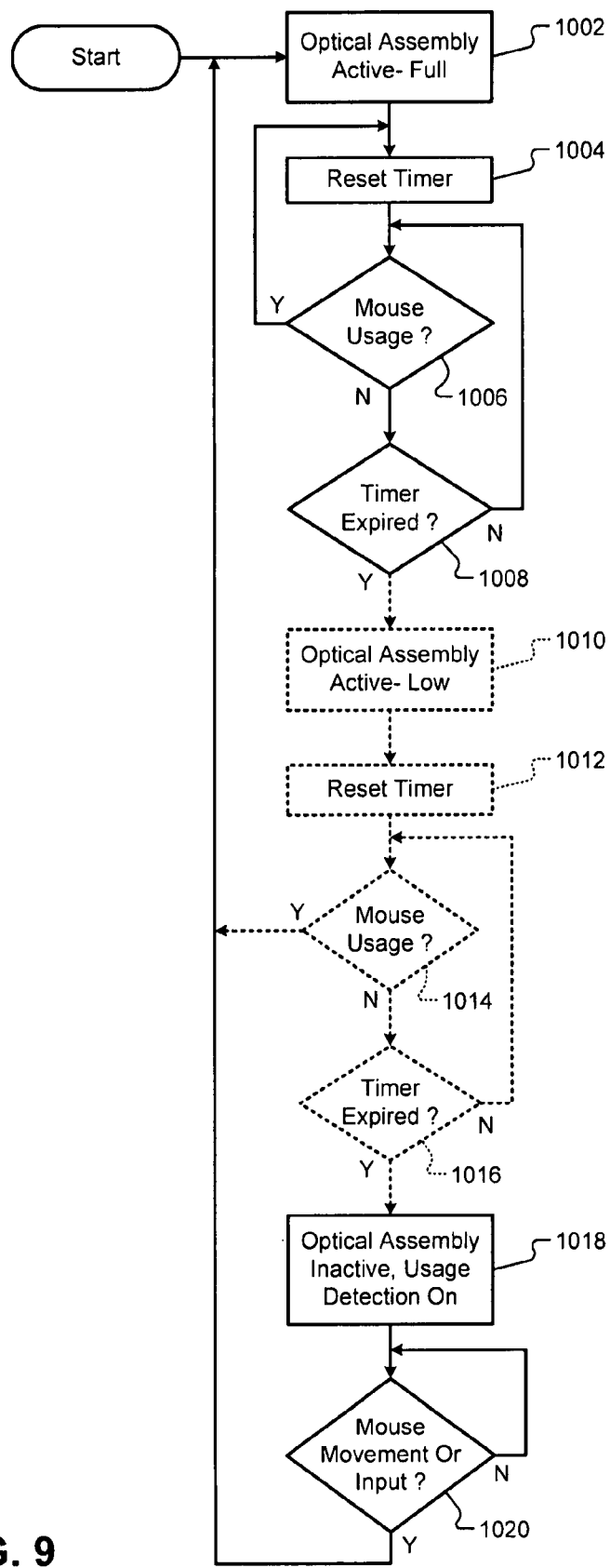
FIG. 9 is a flow chart depicting exemplary steps performed in controlling an optical mouse according to the present disclosure.

Referring now to FIG. 9, a flow chart depicts exemplary steps performed in controlling an optical mouse. Control begins with step 1002, where an optical assembly, such as the optical movement detection module 206 of FIG. 2, is placed in a full-power active mode. Control continues in step 1004, where a timer is reset to a first predetermined period of time.

Control continues in step 1006, where optical mouse usage is determined. If the optical mouse is being used, as evidenced by movement, button presses, or the like, control returns to step 1004; otherwise, control transfers to step 1008. In step 1008, if the timer is not expired, control returns to step 1006; otherwise, control continues in step 1010.

In step 1010, the optical mouse has not been used for the first predetermined amount of time, so the optical assembly is placed in a low-power active mode. In low-power active mode, the optical assembly can imprecisely detect movement and quickly return to full power active mode. Control continues in step 1012, where the timer is reset to a second predetermined period of time. Control continues in step 1014, where optical mouse usage is determined.

If the optical mouse is being used, control returns to step 1002; otherwise, control transfers to step 1016. In step 1016, if the timer has not yet expired, control returns to step 1014; otherwise, control transfers to step 1018. In step 1018, the optical assembly is turned off and usage detection is turned on. Control continues in step 1020, where control determines whether the optical mouse is being moved or other input is being received. For instance, a user may grip the mouse and/or press a button.

If no optical mouse movement or input is detected, control remains in step 1020; otherwise, control returns to step 1002, where power to the optical assembly is restored. In various implementations, when the timer is expired in step 1008, control may transfer directly to step 1018. In this way, after a period of non-use, the optical assembly transitions directly from full-power active mode to inactive mode. The first predetermined period of time may consequently be made longer to avoid prematurely placing the optical assembly in inactive mode.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A wireless mouse comprising:
   an optical movement detection module configured to
      emit light onto a mousing surface, and
      detect movement of the wireless mouse based on a reflection of the light emitted onto the mousing surface;
   a movement detection module comprising a ball configured to contact the mousing surface and rotate based on relative movement between the wireless mouse and the mousing surface;

a first roller rotationally coupled to the ball, the first roller configured to rotate about a first axis; and a sensor module configured to detect movement of the wireless mouse based on a rotation of the first roller about the first axis; and a control module configured to during a time that the wireless mouse is in a stationary position, (i) power down the optical movement detection module and (ii) power up the movement detection module, and responsive to the sensor module of the movement detection module detecting movement of the wireless mouse from the stationary position, (i) power up the optical movement detection module and (ii) power down the movement detection module.

2. The wireless mouse of claim 1, further comprising a touch detection module configured to detect user contact with the wireless mouse, wherein the control module is further configured to power up the optical movement detection module responsive to the touch detection module detecting the user contact with the wireless mouse.

3. The wireless mouse of claim 2, further comprising a user interface configured to detect user input.

4. The wireless mouse of claim 3, wherein the control module configured to power up the optical movement detection module responsive to the user interface detecting the user input.

5. The wireless mouse of claim 3, wherein the user interface comprises a button.

6. The wireless mouse of claim 5, wherein the control module is further configured to power up the optical movement detection module responsive to the button being pressed for a predetermined period.

7. The wireless mouse of claim 3, wherein the control module is further configured to power down the optical movement detection module after a predetermined period during which at least two of (i) the user interface does not detect user input, (ii) the touch detection module does not detect user contact, and (iii) the optical movement detection module does not detect movement of the wireless mouse.

8. The wireless mouse of claim 7, wherein the optical movement detection module is configured to:

detect movement of the wireless mouse with lower accuracy when in a low-power active state; and enter the low-power active state after a second predetermined period during which at least two of: (i) the user interface does not detect user input, (ii) the optical movement detection module does not detect movement of the wireless mouse, and (iii) the touch detection module does not detect user contact with the wireless mouse, wherein the second predetermined period is shorter than the predetermined period.

9. The wireless mouse of claim 2, wherein the touch detection module comprises:

a coupling surface; and a sensor module configured to detect user contact with the coupling surface.

10. The wireless mouse of claim 9, wherein at least a portion of the coupling surface is configured to contact a palm of a user.

11. The wireless mouse of claim 9, wherein the coupling surface includes a first coupling surface and a second coupling surface, and wherein the sensor module is configured to detect user contact based upon an impedance change between the first coupling surface and the second coupling surface.

12. The wireless mouse of claim 9, wherein the sensor module is configured to detect user contact based upon radio frequency (RF) signals coupled to the coupling surface.

13. The wireless mouse of claim 9, wherein the sensor module is configured to detect user contact based upon changes in capacitance of the coupling surface.

14. The wireless mouse of claim 1, wherein the movement detection module includes a second roller, wherein the second roller is configured to rotate about a second axis and is rotationally coupled to the ball, wherein the first axis is generally orthogonal to the second axis.

15. The wireless mouse of claim 1, wherein the movement detection module includes a disk including a magnet, and wherein the sensor module includes a Hall effect sensor.

16. The wireless mouse of claim 1, wherein the movement detection module includes a disk including a magnet, and wherein the sensor module includes a current sensor.

17. The wireless mouse of claim 1, wherein the movement detection module consumers power at a slower rate than the optical movement detection module.

18. The wireless mouse of claim 1, wherein:

movement of the wireless mouse along a first direction corresponds to vertical movement of a corresponding pointer on a display;

movement of the wireless mouse along a second direction corresponds to horizontal movement of the pointer on the display; and the first axis is parallel to neither the first direction nor the second direction.

* * * * *